(12) United States Patent
Palma et al.

(10) Patent No.: US 12,030,614 B2
(45) Date of Patent: Jul. 9, 2024

(54) SYSTEMS AND METHODS FOR COUPLING A STRUT TO A WING OF AN AIRCRAFT

(71) Applicant: The Boeing Company, Chicago, IL (US)

(72) Inventors: Druh Palma, Mill Creek, WA (US); Donald T. Powell, Everett, WA (US)

(73) Assignee: The Boeing Company, Chiscago, IL (US)

( * ) Notice: Subject to any disclaimer, the term of this patent is extended or adjusted under 35 U.S.C. 154(b) by 15 days.

(21) Appl. No.: 17/980,975

(22) Filed: Nov. 4, 2022

(65) Prior Publication Data
US 2024/0150006 A1    May 9, 2024

(51) Int. Cl.
*B64C 1/26* (2006.01)
*B64C 3/18* (2006.01)
*B64C 3/32* (2006.01)

(52) U.S. Cl.
CPC .............. *B64C 1/26* (2013.01); *B64C 3/185* (2013.01); *B64C 3/32* (2013.01)

(58) Field of Classification Search
CPC ................................ B64C 3/32; B64C 27/26
See application file for complete search history.

(56) References Cited

U.S. PATENT DOCUMENTS

| | | | |
|---|---|---|---|
| 4,560,122 A | 12/1985 | Parkinson | |
| 6,938,855 B2 | 9/2005 | Marche | |
| 7,083,143 B2 * | 8/2006 | Whitmer | B64D 27/40 244/54 |
| 7,104,306 B2 | 9/2006 | Huggins | |
| 7,350,747 B2 | 4/2008 | Machado | |
| 7,451,947 B2 | 11/2008 | Machado | |
| 8,727,268 B2 | 5/2014 | Combes | |
| 9,862,497 B2 | 1/2018 | Ewens | |
| 10,358,226 B2 | 7/2019 | Pautis | |
| 10,583,930 B2 | 3/2020 | West | |
| 10,899,463 B2 | 1/2021 | Aten | |
| 11,084,597 B2 | 8/2021 | Pautis | |
| 11,319,079 B2 | 5/2022 | Pautis | |

* cited by examiner

*Primary Examiner* — Timothy D Collins
*Assistant Examiner* — Eric Acosta
(74) *Attorney, Agent, or Firm* — Joseph M. Butscher; The Small PAtent LAw Group LLC

(57) ABSTRACT

A coupling system and method are configured to secure one or more spars of a wing of an aircraft to one or more struts. The coupling system and method include a plurality of interface joints that secure the one or more spars to the one or more struts. At least a portion of a front surface of the one or more spars is linearly aligned with at least a portion of a rear surface of the one more struts.

20 Claims, 4 Drawing Sheets

SYSTEMS AND METHODS FOR COUPLING A STRUT TO A WING OF AN AIRCRAFT

FIELD OF THE DISCLOSURE

Examples of the subject disclosure generally relate to systems and methods for coupling a strut to a wing of an aircraft.

BACKGROUND OF THE DISCLOSURE

Aircraft are used to transport passengers and cargo between various locations. Numerous aircraft depart from and arrive at a typical airport every day.

A typical commercial aircraft includes two wings extending from a fuselage. Each wing includes spars and ribs. In particular, a wing includes a front spar connected to a rear spar through a plurality of ribs. A spar is a beam that extends from the fuselage along a length of a wing, and resists twisting and bending forces, such as when the wing generates lift. In general, spars are the principle structural members of a wing, and support distributed loads. Ribs or bulkheads provide contour or shape to the wing.

Struts are used to connect structural components to the wings. For example, a strut can be used to connect a wing to an engine. In particular, a strut provides a load path from the engine into the wing.

As engine diameters increase to meet performance objectives, positioning of the engine relative to the wing can pose challenges in relation to other aspects of the aircraft configuration. For example, a lower surface of a larger engine extending below a wing can be closer to the ground as compared to a smaller engine. However, increased ground clearance in relation to the engine may be desired.

SUMMARY OF THE DISCLOSURE

A need exists for an improved system and method for securing an engine to a wing. Further, a need exists for a system and method for securing an engine to a wing that ensures a desired ground clearance with respect to the engine.

With those needs in mind, certain examples of the present disclosure provide a coupling system configured to secure one or more spars of a wing of an aircraft to one or more struts. The coupling system includes a plurality of interface joints that secure the one or more spars to the one or more struts, wherein at least a portion of a front surface of the one or more spars is linearly aligned with at least a portion of a rear surface of the one more struts.

In at least one example, an engine is secured to the one or more struts on an end opposite from the coupling system.

At least a portion of the front surface of the one or more spars is linearly aligned along a line that is parallel to an X-axis, which is orthogonal to a Y-axis and a Z-axis. For example, the line is a chord that extends between a first center of the front surface of the one or more spars and a second center of the rear surface of the one or more struts.

In at least one example, the one or more spars is a front spar of the wing.

In at least one example, the plurality of interface joints include a first upper coupling interface joint extending between the rear surface of the one or more struts and the front surface of the one or more spars, a second upper coupling interface joint extending between the rear surface of the one or more struts and the front surface of the one or more spars, a first side coupling interface joint extending from a first side of the one or more struts and the one or more spars, a second side coupling interface joint extending from a second side of the one or more struts and the one or more spars, and a lower coupling interface joint extending between a lower rear surface of the one or more struts and a lower front surface of the one or more spars.

In at least one example, no portions of the first side coupling interface joint and the second side coupling interface joint are within the one or more struts.

In at least one example, the lower coupling interface includes a first lateral brace extending forwardly from the lower front surface of the one or more spars, a second lateral brace extending forwardly from the lower front surface of the one or more spars, and a central interior fitting extending downwardly and rearwardly from the lower rear surface of the one or more struts. At least a portion of the central interior fitting is secured between the first lateral brace and the second lateral brace.

In at least one example, the central interior fitting is coupled to the first lateral brace and the second lateral through a plurality of pins. The plurality of pins can include a first upper pin, a second upper pin, and a lower pin. One or both of the first upper pin or the second upper pin provides an intact load path, and the lower pin provides a fail-safe load path (such as in relation to a lower link). In at least one example, the first upper pin and the second upper pin have a first diameter, and the lower pin has a second diameter that is greater than the first diameter.

In at least one example, the first coupling interface joint, the second coupling interface joint, and the lower coupling interface joint include pivot axes that are parallel to a Y-axis, and the first side coupling interface and the second side coupling interface include pivot axes that are parallel to a Z-axis, which is orthogonal to the Y-axis.

Certain examples of the present disclosure provide a method configured to secure one or more spars of a wing of an aircraft to one or more struts. The method includes securing, by a plurality of interface joints, the one or more spars to the one or more struts, wherein at least a portion of a front surface of the one or more spars is linearly aligned with at least a portion of a rear surface of the one more struts.

Certain examples of the present disclosure provide an aircraft including a fuselage, a wing extending from the fuselage, wherein the wing comprises a front spar, a coupling system securing the front spar of the wing to one or more struts, as described herein, and an engine secured to the one or more struts on an end opposite from the coupling system.

DETAILED DESCRIPTION OF THE DISCLOSURE

Figure 1:
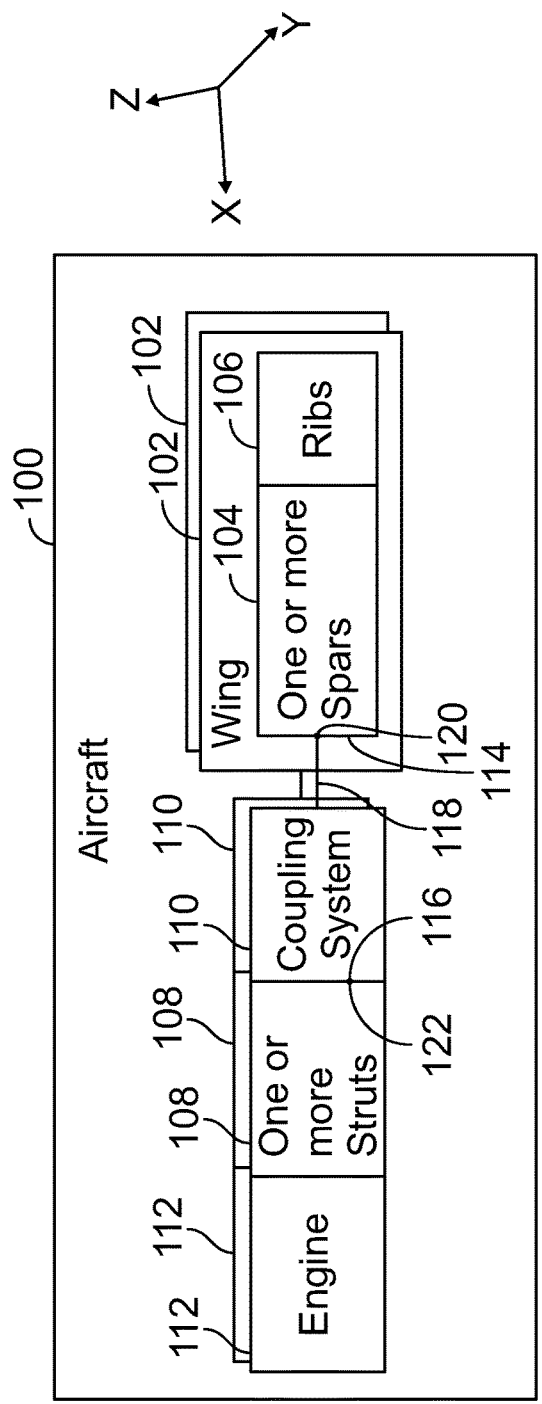
FIG. 1 illustrates a simplified block diagram of an aircraft, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the subject disclosure provide a system and method for a securing an engine to a wing of an aircraft. In at least one example, the system and method include five discrete interfaces that provide attachments between one or more struts (which can connect to an engine), and the wing. The strut(s) can be or otherwise form a strut box that includes spars joined by vertical webs and/or frames. The struts(s) are aligned vertically with a wing spar and are integrated to the wing with links which form the lateral load path for the propulsion structure to fittings on the wing front spar. Additionally, other load components are transferred between three discrete attachment locations. The strut lower horizontal spar transfers load to the lower wing interface via a large fitting and fail safe link which share three pinned interfaces. Two of the pinned interfaces are primary loading interfaces, while the third can be a fail-safe loading interface.

In at least one example, a primary lateral load path between the strut(s) and the wing is through links which extend from the outer sides (outboard of the upper spar fittings) of the strut(s) to fittings which can be parallel to the wing front spar, in contrast to traditional side links which are nested inboard of the upper spar fittings of a strut box. A lower drag brace interface includes redundant three hole links in a triangular pattern (with two holes on the forward end, and one hole on a rearward end), and redundant lug fittings. An upper pin interface on the strut side is the intact load path. A lower pin interface on the strut side is oversized, such that it absorb load in the event of a failure of the upper pin. The third pin in the lower brace attaches to the wing front spar, and contains a pin or feature which fuses in the event of an overload allowing the engine to rotate upward.

In at least one example, a coupling system connects the wing to one or more struts. The coupling system includes discrete pinned joints to keep load paths and installation simple, but compresses the integration space into a shorter form factor. The coupling system allows for an in-line strut to wing configuration, which disposes an engine upward, thereby significantly increasing ground clearance.

FIG. 1 illustrates a simplified block diagram of an aircraft 100, according to an example of the present disclosure. The aircraft 100 includes wings 102 extending from a fuselage. The wings 102 includes one or more spars 104 and ribs 106 connected to the spars 104. For example, the wings 102 includes a front spar connected to a rear spar. A plurality of ribs extends between the front spar and the rear spar.

The wing 102 is connected to one or more struts 108 through a coupling system 110. The one or more struts 108 can be a strut box, which includes spars joined by vertical webs and/or frames. The strut box can be a single strut or multiple struts. As another example, a single strut 108 can connect to the wing 102 through the coupling system 110. As another example, a plurality of struts 108, whether part of a strut box or not, can connect to the wing 102 through the coupling system 110.

The strut(s) 108 connect an engine 112 to the wing 102 through the coupling system 110. The coupling system 110 connects the spar(s) 104 of the wing 102 to the strut(s) 108 in an in-line fashion. For example, a front surface 114 of the spar(s) 104 is linearly aligned with a rear surface 116 of the strut(s) 108, such as along a line 118 that is parallel to an X-axis, which is orthogonal to a Y-axis and a Z-axis. In at least one example, the line 118 is a chord that extends between a center 120 of the front surface 114 of the spar(s) 104 and a center 122 of the rear surface 116 of the strut(s) 108. As such, at least a portion of the strut(s) 108 is directly in front of at least a portion of the spar(s) 104. Because the coupling system 110 secures the strut(s) 108 to the spar(s) 104 in an in-line fashion, the engine 112 can also be mounted in an in-line fashion with at least a portion of the wing 102 (such as above or below the strut(s) 108). Therefore, the engine 112 need not be secured underneath the wing 102, which, in turn, provides increased ground clearance in relation to the engine 112 and the wing 102.

As described herein, the coupling system 110 includes a plurality of interface joints that secure the strut(s) 108 to the spar(s) 104. The coupling system 110 is configured to secure the one or more spars 104 of the wing 102 of the aircraft 100 to the one or more struts 108. The coupling system 110 includes a plurality of interface joints, as described herein, that secure the one or more spars 104 to the one or more struts 108. At least a portion of a front surface 114 of the one or more spars 104 is linearly aligned (such as along a line 118 that is parallel to the X-axis) with at least a portion of a rear surface 116 of the one more struts 108. The engine 112 is secured to the one or more struts 108 opposite from (such as on an opposite end of the strut(s) 108) the coupling system 110.

Figure 2:
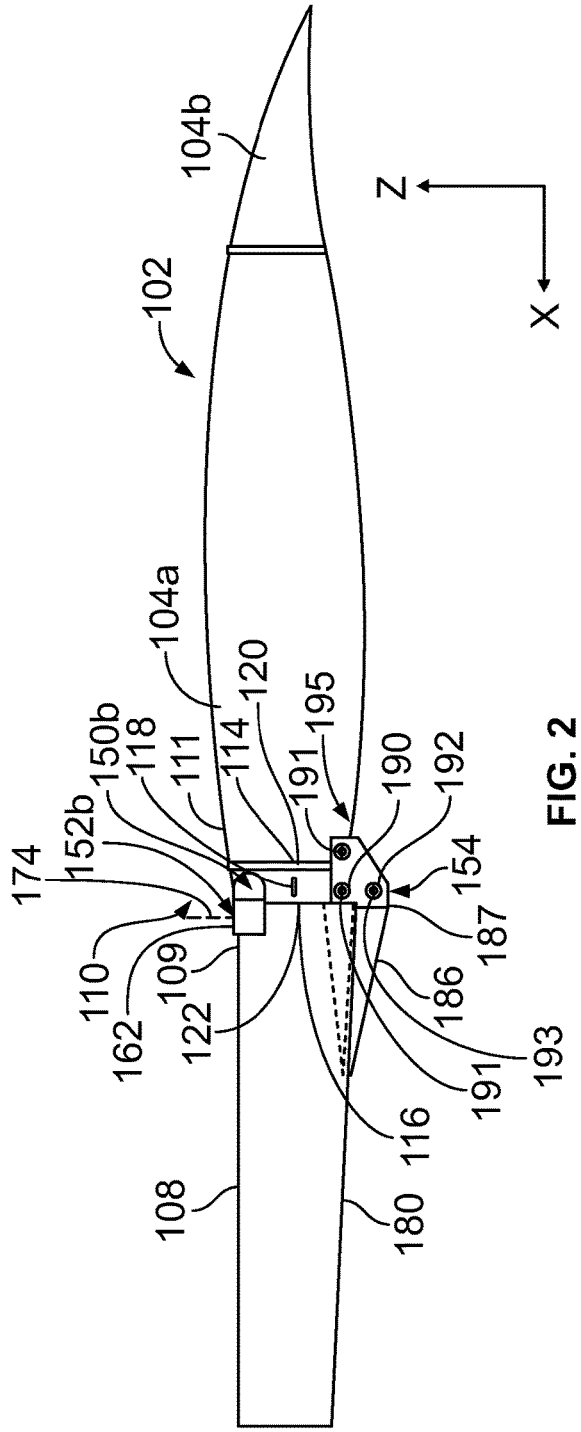
FIG. 2 illustrates a lateral view of a spar connected to a strut through a coupling system, according to an example of the present disclosure.

FIG. 2 illustrates a lateral view of a spar 104a connected to a strut 108 through the coupling system 110, according to an example of the present disclosure. As shown, the spar 104a is a front spar of the wing 102, which can also include a spar 104b, such as a rear spar. The coupling system 110 connects the spar 104a to the strut 108 in an in-line fashion, such that the line 118 between the center 120 of the front surface 114 of the spar 104a and the center 122 of the rear surface 116 of the strut 108 is parallel to the X-axis (such as a horizontal axis that is parallel to a ground surface that supports landing gear of an aircraft).

Figure 3:
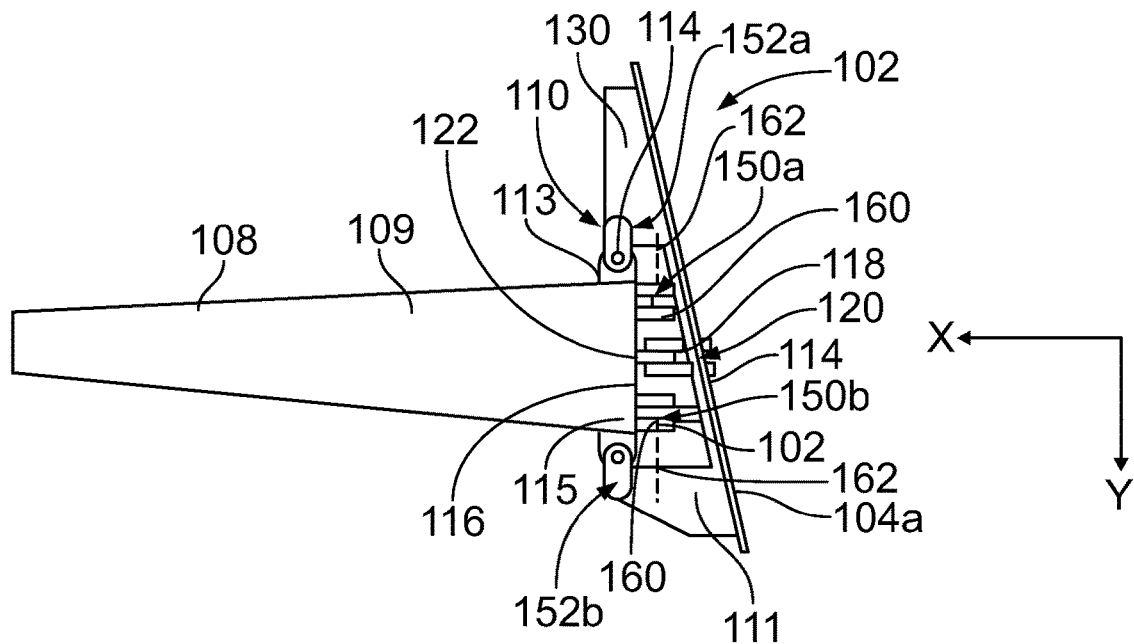
FIG. 3 illustrates a top view of the spar connected to the strut through the coupling system.

FIG. 3 illustrates a top view of the spar 104a connected to the strut 108 through the coupling system 110. A mounting bracket 130 extends from the front surface 114 of the spar 104a. The mounting bracket 130 can be separately secured to the spar 104a. Optionally, the mounting bracket 130 can be integrally formed with the spar 104a.

Figure 4:
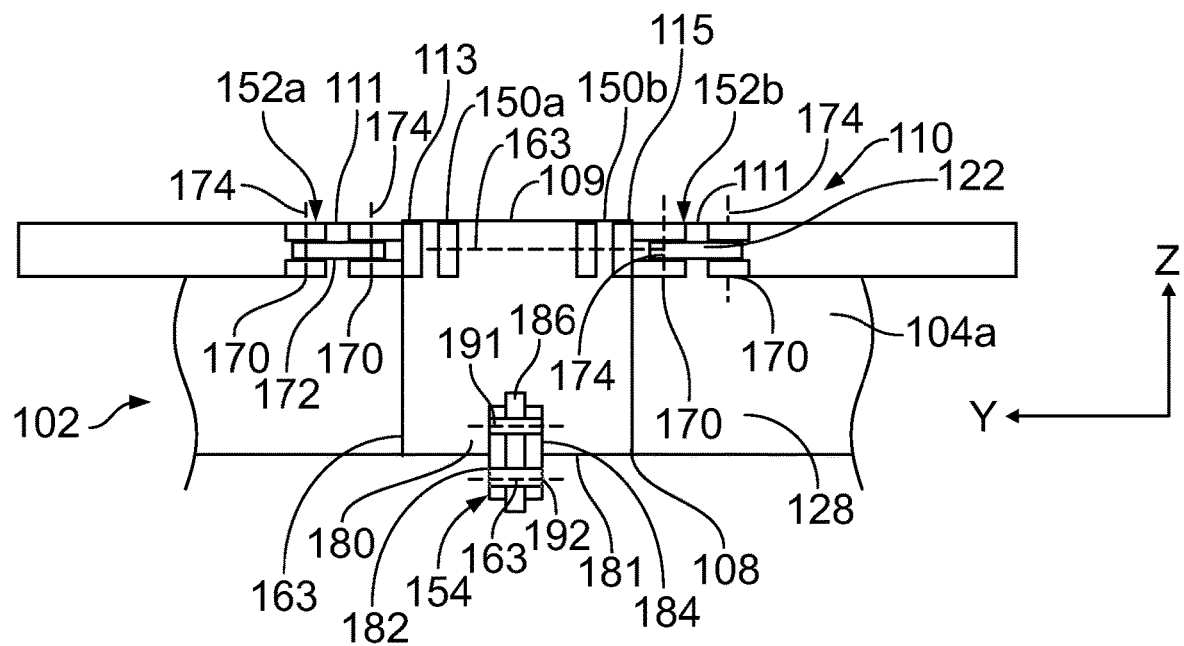
FIG. 4 illustrates a front view of the spar connected to the strut through the coupling system.

FIG. 4 illustrates a front view of the spar 104a connected to the strut 108 through the coupling system 110. Referring to FIGS. 2-4, the coupling system 110 includes a plurality of interface joints that secure the front spar 104a to the strut 108. In at least one example, the coupling system 110 includes a first upper coupling interface joint 150a, a second upper coupling interface joint 150b, a first side coupling interface joint 152a, a second side coupling interface joint 152b, and a lower coupling interface joint 154.

The first upper coupling interface joint 150a extends between the rear surface 116 of the strut 108 (at or proximate to (such as at or within six inches or less, or optionally greater than 6 inches) an upper surface 109 of the strut 108)

and the front surface 114 of the spar 104a proximate to (such as at or within six inches or less) an upper surface 111 of the spar 104a. The first coupling interface joint 150a is disposed at or proximate a first side 113 of the strut 108. The first coupling interface joint 150a includes a clevis 160 pivotally coupled to a reciprocal leading edge structure, rib extension, fin or other such portion of the spar 104a through a lug or pin that allows pivotal motion about an axis 162, such as a horizontal axis that is parallel with the Y-axis.

Similarly, the second upper coupling interface joint 150b extends between the rear surface 116 of the strut 108 (at or proximate to (such as at or within six inches or less) the upper surface 109 of the strut 108) and the front surface 114 of the spar 104a proximate to (such as at or within six inches or less) the upper surface 111 of the spar 104a. The second coupling interface joint 150a is disposed at or proximate a second side 115 of the strut 108. The second coupling interface joint 150a includes a clevis 160 pivotally coupled to a reciprocal fin or other such portion of the spar 104a through a lug or pin that allows pivotal motion about the axis 162, such as a horizontal axis that is parallel with the Y-axis.

The first side coupling interface joint 152a extends from the first side 113 of the strut 108 at or proximate to the upper surface 109. In at least one example, the first side coupling interface joint 152a includes one or more devises 170 pivotally coupled to a connecting fin 172 through one or more lugs or pins that allow pivotal motion about one or more axes 174, such as vertical axes that are parallel to the Z-axis, and orthogonal to the X-axis and the Y-axis. The first side coupling interface joint 152a connects the strut 108 to the spar 104a. The first side coupling interface joint 152a can include a single clevis, or multiple devises (as shown). The first side coupling interface joint 152a is outboard from the strut 108. For example, the first side coupling interface joint 152a outwardly extends from the first side 113 of the strut 108, and does not include any portion within the strut 108.

Similarly, the second side coupling interface joint 152b extends from the second side 113 of the strut 108 at or proximate to the upper surface 109. In at least one example, the second side coupling interface joint 152b includes one or more devises 170 pivotally coupled to a connecting fin 172 through one or more lugs or pins that allow pivotal motion about one or more axes 174, such as vertical axes that are parallel to the Z-axis, and orthogonal to the X-axis and the Y-axis. The second side coupling interface joint 152b connects the strut 108 to the spar 104a. The second side coupling interface joint 152b can include a single clevis, or multiple devises (as shown). The second side coupling interface joint 152b is outboard from the strut 108. For example, the second side coupling interface joint 152b outwardly extends from the second side 115 of the strut 108, and does not include any portion within the strut 108. In at least one example, a primary lateral load path between the strut 108 and the spar 104a is through the first side coupling interface joint 152a and the second side coupling interface joint 152b, which extend from opposite sides 113 and 115, respectively, of the spar 104 (in contrast to known traditional side links which are nested inboard of the upper spar fittings of a strut box). In at least one example, both connecting fins 172 can be on a single side of the strut 108, each of which can be aligned with upper and/or lower spars. As another example, one or both of the connecting fin 172 can be between the joints 150a and 150b.

In at least one example, the lower coupling interface joint 154 can extend between a lower rear surface 180 of the strut 108 and a lower front surface 181 of the spar 104a. The lower coupling interface joint 154 can include a first lateral brace 182 and a second lateral brace 184 extending forwardly from the lower front surface 181 of the spar 104a. The lower coupling interface joint 154 also includes a central interior fitting 186 extending downwardly and rearwardly from the lower rear surface 180 of the strut 108 (and optionally, a portion extending from a rear surface of the strut 108). The central interior fitting 186 includes at least a portion secured between the first lateral brace 182 and the second lateral brace 184. A rear end 187 of the central interior fitting 186 is coupled to the first lateral brace 182 and the second lateral brace 184 through a plurality of pins, such as two upper pins 190 (that is, a first upper pin 190 and a second upper pin 190) and a lower pin 192. The pins 190 and 192 define axes that are parallel to the Y-axis (and orthogonal to the X-axis and the Z-axis).

The lower coupling interface joint 154 transfers load to the lower portion of the spar 104a via the first lateral brace 182, the second lateral brace 184, the central interior fitting 186, and the three pins 190 and 192. In at least one example, the two upper pins 190 provide an intact load path, while the lower pin 192 provides a fail-safe load path or redundant link, which provides a load path in the event one or both of the upper pins 190 exhibit an anomaly (such as by being damaged). For example, the upper pins 190 provide primary loading interfaces, while the lower pin 192 provides a fail-safe loading interface.

The lower coupling interface joint 154, which can be referred to as a lower drag brace interface, includes the redundant three hole links in a triangular pattern 195 (with the one of the upper pins 190 and the lower pin 192 on a forward end toward the strut 108, and the other of the upper pins 190 on a rearward end toward the wing 102). One or both of the upper pins 190 provide the intact load path. A diameter of the lower pin 192 may be greater than the diameter of each of the upper pins 190. As an example, the first upper pin 190 and the second upper pin 190 each have a first diameter 191. The lower pin 192 has a second diameter 193 that is greater than the first diameter 191. Therefore, the lower pin 192 can be larger than each of the upper pins 190. The oversized lower pin 192 is able to absorb load in the event of a failure of one or both of the upper pins 190. In at least one example, the lower pin 192 attaches to the front spar 104a, and can be configured to fuse in the event of an overload allowing the engine 112 (shown in FIG. 1) to rotate upward.

As shown and described, in at least one example, the coupling system 110 includes five discrete interface joints (namely the first upper coupling interface joint 150a, the second upper coupling interface joint 150b, the first side coupling interface joint 152a, the second side coupling interface joint 152b, and the lower coupling interface joint 154) that connect the strut 108 to the spar 104a.

As described, the first coupling interface joint 150a, the second coupling interface joint 150b, and the lower coupling interface joint include pivot axes 163 (such as via pins or lugs coupled to devises) that are parallel to the Y-axis. In contrast, the first side coupling interface 152a and the second side coupling interface 152b include pivot axes 174 that are parallel to the Z-axis, which is orthogonal to the Y-axis.

Figure 5:
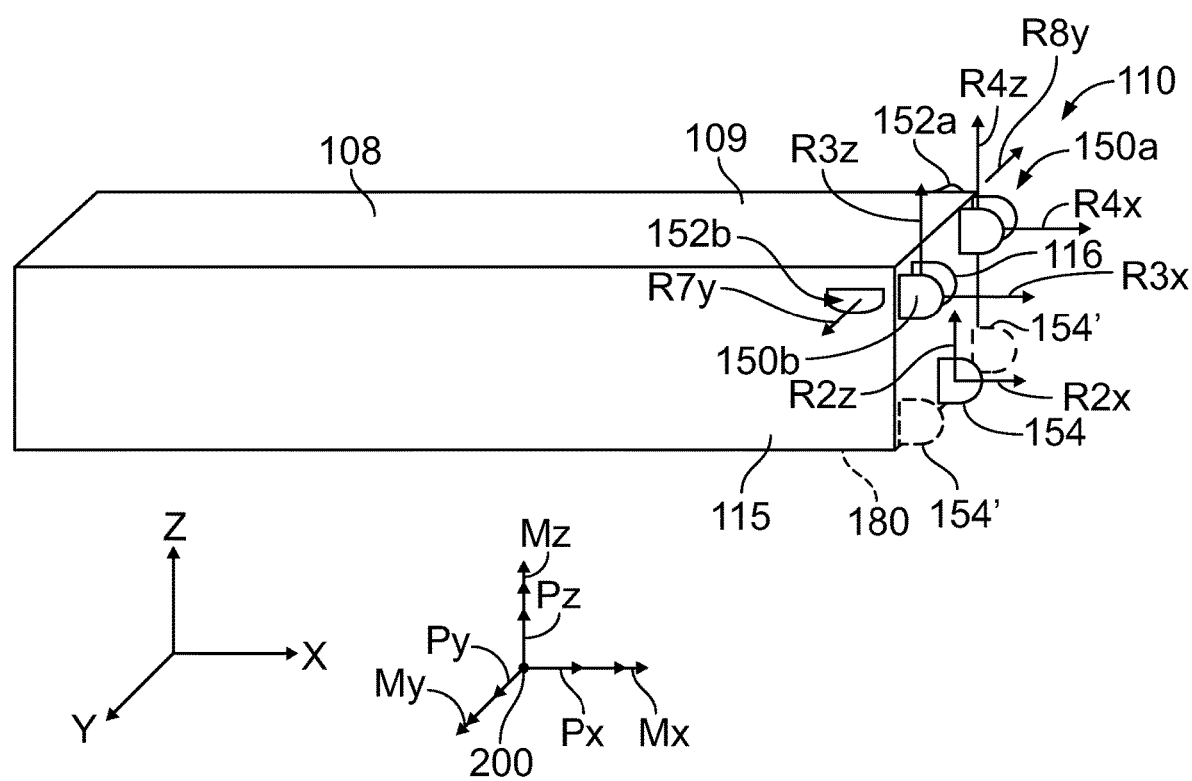
FIG. 5 illustrates a simplified isometric view of the coupling system secured to the strut, according to an example of the present disclosure.

FIG. 5 illustrates a simplified isometric view of the coupling system 110 secured to the strut 108, according to an example of the present disclosure. For the sake of clarity, the wing is not shown in FIG. 5. FIG. 5 shows a strut to wing free body diagram, and an applied load point 200. The following table describes reactions by the coupling system 110 to applied loads.

| Applied Load | Reaction |
|---|---|
| Px | R3x. R4x. R2x, My, Mz moment couple (R234) |
| Py | R7y, R8y, Mx, and Mz couple (R34) |
| Pz | R3z, R4z, R2z, Mx, and My moment couple (R34) |
| Mx | R3z, R4z, moment couple |
| My | R3x + R4x. R2x moment couple |
| Mz | R3x, R4x moment couple |

As described, the coupling system 110 includes the lower coupling interface joint 154. Optionally, the coupling system 110 can include a plurality of lower coupling interface joints, such as lower lateral coupling interface joints 154', which are configured as described above, but can be located at lower corners of the strut 108. In at least one example, the lower lateral coupling interface joints 154' replace the lower coupling interface joint 154. In at least one other example, the coupling system 110 includes the lower coupling interface joint 154 as well as the two lower lateral coupling interface joints 154'.

Figure 6:
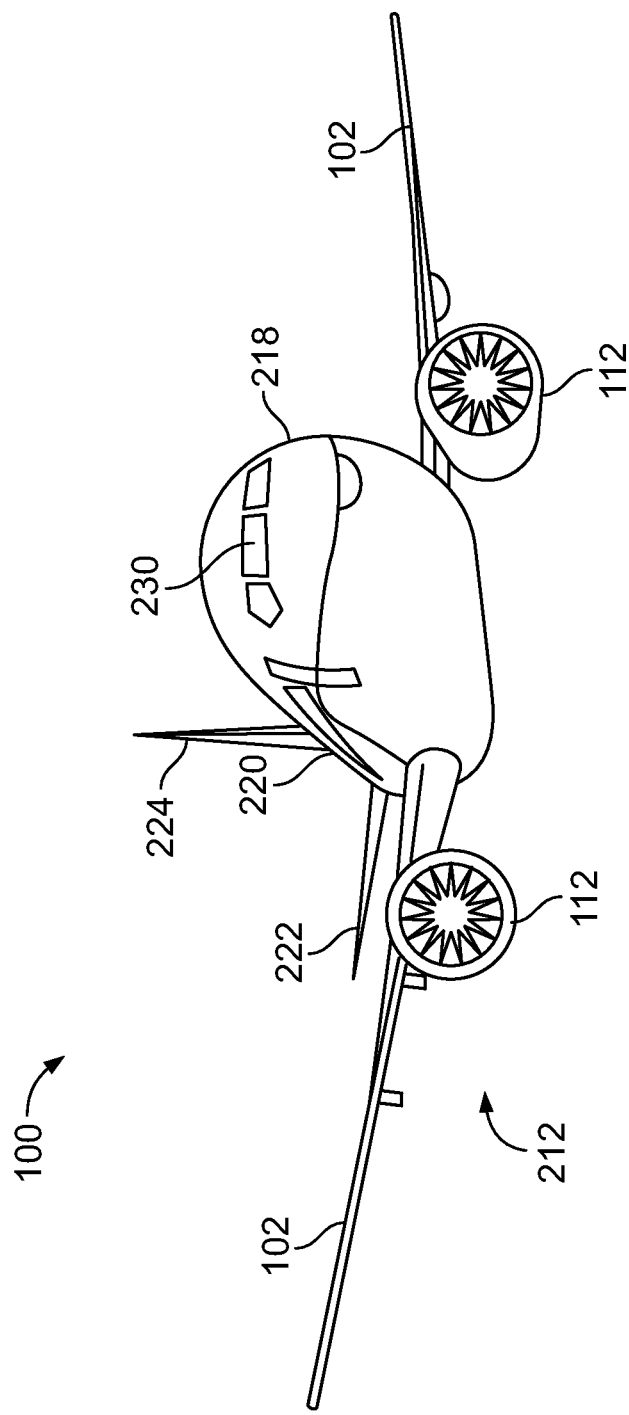
FIG. 6 illustrates a perspective front view of an aircraft, according to an example of the subject disclosure.

FIG. 6 illustrates a perspective front view of an aircraft 100, according to an example of the subject disclosure. The aircraft 100 includes a propulsion system 212 that includes engines 112, for example. Optionally, the propulsion system 212 may include more engines 112 than shown. The engines 112 are carried by wings 102 of the aircraft 100. Referring to FIGS. 1-6, the coupling systems 110 secure the struts 108 to the spars 104, and the engines 112 are secured to the struts 108 opposite from the spars 104. In other examples, the engines 112 may be carried by a fuselage 218 and/or an empennage 220, and the coupling systems 110 can secure the engines thereto. The empennage 220 may also support horizontal stabilizers 222 and a vertical stabilizer 224. The fuselage 218 of the aircraft 100 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. FIG. 6 shows an example of an aircraft 100. It is to be understood that the aircraft 100 can be sized, shaped, and configured differently than shown in FIG. 6.

Further, the disclosure comprises examples according to the following clauses:

Clause 1. A coupling system configured to secure one or more spars of a wing of an aircraft to one or more struts, the coupling system comprising:
a plurality of interface joints that secure the one or more spars to the one or more struts, wherein at least a portion of a front surface of the one or more spars is linearly aligned with at least a portion of a rear surface of the one more struts.

Clause 2. The coupling system of Clause 1, wherein an engine is secured to the one or more struts on an end opposite from the coupling system.

Clause 3. The coupling system of Clauses 1 or 2, wherein the at least a portion of the front surface of the one or more spars is linearly aligned along a line that is parallel to an X-axis, which is orthogonal to a Y-axis and a Z-axis.

Clause 4. The coupling system of Clause 3, wherein the line is a chord that extends between a first center of the front surface of the one or more spars and a second center of the rear surface of the one or more struts.

Clause 5. The coupling system of any of Clauses 1-4, wherein the one or more spars is a front spar of the wing.

Clause 6. The coupling system of any of Clauses 1-5, wherein the plurality of interface joints comprise:
a first upper coupling interface joint extending between the rear surface of the one or more struts and the front surface of the one or more spars;
a second upper coupling interface joint extending between the rear surface of the one or more struts and the front surface of the one or more spars;
a first side coupling interface joint extending from a first side of the one or more struts and the one or more spars;
a second side coupling interface joint extending from a second side of the one or more struts and the one or more spars; and
a lower coupling interface joint extending between a lower rear surface of the one or more struts and a lower front surface of the one or more spars.

Clause 7. The coupling system of Clause 6, wherein no portions of the first side coupling interface joint and the second side coupling interface joint are within the one or more struts.

Clause 8. The coupling system of Clauses 6 or 7, wherein the lower coupling interface comprises:
a first lateral brace extending forwardly from the lower front surface of the one or more spars;
a second lateral brace extending forwardly from the lower front surface of the one or more spars; and
a central interior fitting extending downwardly and rearwardly from the lower rear surface of the one or more struts, wherein at least a portion of the central interior fitting is secured between the first lateral brace and the second lateral brace.

Clause 9. The coupling system of Clause 8, wherein the central interior fitting is coupled to the first lateral brace and the second lateral through a plurality of pins.

Clause 10. The coupling system of Clause 9, wherein the plurality of pins comprise:
a first upper pin;
a second upper pin; and
a lower pin, wherein one or both of the first upper pin or the second upper pin provides an intact load path, and the lower pin provides a fail-safe load path.

Clause 11. The coupling system of Clause 10, wherein the first upper pin and the second upper pin have a first diameter, and wherein the lower pin has a second diameter that is greater than the first diameter.

Clause 12. The coupling system of any of Clauses 6-11, wherein the first coupling interface joint, the second coupling interface joint, and the lower coupling interface joint include pivot axes that are parallel to a Y-axis, and the first side coupling interface and the second side coupling interface include pivot axes that are parallel to a Z-axis, which is orthogonal to the Y-axis.

Clause 13. A method configured to secure one or more spars of a wing of an aircraft to one or more struts, the method comprising:
securing, by a plurality of interface joints, the one or more spars to the one or more struts, wherein at least a portion of a front surface of the one or more spars is linearly aligned with at least a portion of a rear surface of the one more struts.

Clause 14. The method of Clause 13, further comprising securing an engine to the one or more spars on an end opposite from the coupling system.

Clause 15. The method of Clauses 13 or 14, wherein said securing comprises linearly aligning the at least a portion of the front surface of the one or more spars along a line that is parallel to an X-axis, which is orthogonal to a Y-axis and a Z-axis, wherein the line is a chord that extends between a first center of the front surface of the one or more spars and a second center of the rear surface of the one or more struts.

Clause 16. The method of any of Clauses 13-15, wherein the plurality of interface joints comprise:
  a first upper coupling interface joint extending between the rear surface of the one or more struts and the front surface of the one or more spars;
  a second upper coupling interface joint extending between the rear surface of the one or more struts and the front surface of the one or more spars;
  a first side coupling interface joint extending from a first side of the one or more struts and the one or more spars;
  a second side coupling interface joint extending from a second side of the one or more struts and the one or more spars; and
  a lower coupling interface joint extending between a lower rear surface of the one or more struts and a lower front surface of the one or more spars.

Clause 17. An aircraft comprising:
  a fuselage;
  a wing extending from the fuselage, wherein the wing comprises a front spar;
  a coupling system securing the front spar of the wing to one or more struts, wherein the coupling system comprises systems a plurality of interface joints that secure the front spar to the one or more struts, wherein at least a portion of a front surface of the front spar is linearly aligned with at least a portion of a rear surface of the one more struts, wherein the at least a portion of the front surface of the front spar is linearly aligned along a line that is parallel to an X-axis, which is orthogonal to a Y-axis and a Z-axis, wherein the line is a chord that extends between a first center of the front surface of the front spar and a second center of the rear surface of the one or more struts; and
  an engine secured to the one or more struts on an end opposite from the coupling system.

Clause 18. The aircraft of Clause 17, wherein the plurality of interface joints comprise:
  a first upper coupling interface joint extending between the rear surface of the one or more struts and the front surface of the front spar;
  a second upper coupling interface joint extending between the rear surface of the one or more struts and the front surface of the front spar;
  a first side coupling interface joint extending from a first side of the one or more struts and the front spar;
  a second side coupling interface joint extending from a second side of the one or more struts and the front spar; and
  a lower coupling interface joint extending between a lower rear surface of the one or more struts and a lower front surface of the front spar.

Clause 19. The aircraft of Clause 18, wherein the lower coupling interface comprises:
  a first lateral brace extending forwardly from the lower front surface of the front spar;
  a second lateral brace extending forwardly from the lower front surface of the front spar; and
  a central interior fitting extending downwardly and rearwardly from the lower rear surface of the one or more struts, wherein at least a portion of the central interior fitting is secured between the first lateral brace and the second lateral brace, wherein the central interior fitting is coupled to the first lateral brace and the second lateral through a plurality of pins, wherein the plurality of pins comprise:
  a first upper pin;
  a second upper pin, wherein the first upper pin and the second upper pin have a first diameter; and
  a lower pin, wherein one or both of the first upper pin or the second upper pin provides an intact load path, and the lower pin provides a fail-safe load path, and wherein the lower pin has a second diameter that is greater than the first diameter.

Clause 20. The aircraft of Clauses 18 or 19, wherein the first coupling interface joint, the second coupling interface joint, and the lower coupling interface joint include pivot axes that are parallel to a Y-axis, and the first side coupling interface and the second side coupling interface include pivot axes that are parallel to a Z-axis, which is orthogonal to the Y-axis.

As described herein, examples of the subject disclosure provide an improved system and method for securing an engine to a wing. Further, examples of the present disclosure provide a system and method for securing an engine to a wing that ensures a desired ground clearance with respect to the engine.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A coupling system configured to secure one or more spars of a wing of an aircraft to one or more struts, the coupling system comprising:
   a plurality of interface joints that secure the one or more spars to the one or more struts, wherein at least a portion of a front surface of the one or more spars is linearly aligned with at least a portion of a rear surface of the one or more struts, wherein the plurality of interface joints comprise:
      a first upper coupling interface joint extending between the rear surface of the one or more struts and the front surface of the one or more spars;
      a second upper coupling interface joint extending between the rear surface of the one or more struts and the front surface of the one or more spars;
      a first side coupling interface joint extending from a first side of the one or more struts and the one or more spars;
      a second side coupling interface joint extending from a second side of the one or more struts and the one or more spars; and
      a lower coupling interface joint extending between a lower rear surface of the one or more struts and a lower front surface of the one or more spars, wherein the lower coupling interface comprises: (a) a first lateral brace extending forwardly from the lower front surface of the one or more spars; (b) a second lateral brace extending forwardly from the lower front surface of the one or more spars; and (c) a central interior fitting extending downwardly and rearwardly from the lower rear surface of the one or more struts, wherein at least a portion of the central interior fitting is secured between the first lateral brace and the second lateral brace.

2. The coupling system of claim 1, wherein an engine is secured to the one or more struts on an end opposite from the coupling system.

3. The coupling system of claim 1, wherein the at least a portion of the front surface of the one or more spars is linearly aligned along a line that is parallel to an X-axis, which is orthogonal to a Y-axis and a Z-axis.

4. The coupling system of claim 3, wherein the line is a chord that extends between a first center of the front surface of the one or more spars and a second center of the rear surface of the one or more struts.

5. The coupling system of claim 1, wherein the one or more spars is a front spar of the wing.

6. The coupling system of claim 1, wherein no portions of the first side coupling interface joint and the second side coupling interface joint are within the one or more struts.

7. The coupling system of claim 1, wherein the central interior fitting is coupled to the first lateral brace and the second lateral through a plurality of pins.

8. The coupling system of claim 7, wherein the plurality of pins comprise:
   a first upper pin;
   a second upper pin; and
   a lower pin, wherein one or both of the first upper pin or the second upper pin provides an intact load path, and the lower pin provides a fail-safe load path.

9. The coupling system of claim 8, wherein the first upper pin and the second upper pin have a first diameter, and wherein the lower pin has a second diameter that is greater than the first diameter.

10. The coupling system of claim 1, wherein the first coupling interface joint, the second coupling interface joint, and the lower coupling interface joint include pivot axes that are parallel to a Y-axis, and the first side coupling interface and the second side coupling interface include pivot axes that are parallel to a Z-axis, which is orthogonal to the Y-axis.

11. A method configured to secure one or more spars of a wing of an aircraft to one or more struts, the method comprising:
   securing, by a plurality of interface joints, the one or more spars to the one or more struts, wherein at least a portion of a front surface of the one or more spars is linearly aligned with at least a portion of a rear surface of the one more struts, wherein the plurality of interface joints comprise:
      a first upper coupling interface joint extending between the rear surface of the one or more struts and the front surface of the one or more spars;
      a second upper coupling interface joint extending between the rear surface of the one or more struts and the front surface of the one or more spars;
      a first side coupling interface joint extending from a first side of the one or more struts and the one or more spars;
      a second side coupling interface joint extending from a second side of the one or more struts and the one or more spars; and
      a lower coupling interface joint extending between a lower rear surface of the one or more struts and a lower front surface of the one or more spars, wherein the lower coupling interface comprises: (a) a first lateral brace extending forwardly from the lower front surface of the one or more spars; (b) a second lateral brace extending forwardly from the lower front surface of the one or more spars; and (c) a central interior fitting extending downwardly and rearwardly from the lower rear surface of the one or more struts, wherein at least a portion of the central interior fitting is secured between the first lateral brace and the second lateral brace.

12. The method of claim 11, further comprising securing an engine to the one or more spars on an end opposite from the coupling system.

13. The method of claim 11, wherein said securing comprises linearly aligning the at least a portion of the front surface of the one or more spars along a line that is parallel to an X-axis, which is orthogonal to a Y-axis and a Z-axis, wherein the line is a chord that extends between a first center of the front surface of the one or more spars and a second center of the rear surface of the one or more struts.

14. The method of claim 11, wherein the central interior fitting is coupled to the first lateral brace and the second lateral through a plurality of pins.

15. The method of claim 14, wherein the plurality of pins comprise:
a first upper pin;
a second upper pin; and
a lower pin, wherein one or both of the first upper pin or the second upper pin provides an intact load path, and the lower pin provides a fail-safe load path.

16. The method of claim 15, wherein the first upper pin and the second upper pin have a first diameter, and wherein the lower pin has a second diameter that is greater than the first diameter.

17. An aircraft comprising:
a fuselage;
a wing extending from the fuselage, wherein the wing comprises a front spar;
a coupling system securing the front spar of the wing to one or more struts, wherein the coupling system comprises systems a plurality of interface joints that secure the front spar to the one or more struts, wherein at least a portion of a front surface of the front spar is linearly aligned with at least a portion of a rear surface of the one more struts, wherein the at least a portion of the front surface of the front spar is linearly aligned along a line that is parallel to an X-axis, which is orthogonal to a Y-axis and a Z-axis, wherein the line is a chord that extends between a first center of the front surface of the front spar and a second center of the rear surface of the one or more struts, wherein the plurality of interface joints comprise:
a first upper coupling interface joint extending between the rear surface of the one or more struts and the front surface of the front spar;
a second upper coupling interface joint extending between the rear surface of the one or more struts and the front surface of the front spar;
a first side coupling interface joint extending from a first side of the one or more struts and the front spar;
a second side coupling interface joint extending from a second side of the one or more struts and the front spar; and
a lower coupling interface joint extending between a lower rear surface of the one or more struts and a lower front surface of the front spar, wherein the lower coupling interface comprises: (a) a first lateral brace extending forwardly from the lower front surface of the front spar; (b) a second lateral brace extending forwardly from the lower front surface of the front spar; and (c) a central interior fitting extending downwardly and rearwardly from the lower rear surface of the one or more struts, wherein at least a portion of the central interior fitting is secured between the first lateral brace and the second lateral brace; and
an engine secured to the one or more struts on an end opposite from the coupling system.

18. The aircraft of claim 17,
wherein the central interior fitting is coupled to the first lateral brace and the second lateral through a plurality of pins, wherein the plurality of pins comprise:
a first upper pin;
a second upper pin, wherein the first upper pin and the second upper pin have a first diameter; and
a lower pin, wherein one or both of the first upper pin or the second upper pin provides an intact load path, and the lower pin provides a fail-safe load path, and wherein the lower pin has a second diameter that is greater than the first diameter.

19. The aircraft of claim 17, wherein the first coupling interface joint, the second coupling interface joint, and the lower coupling interface joint include pivot axes that are parallel to a Y-axis, and the first side coupling interface and the second side coupling interface include pivot axes that are parallel to a Z-axis, which is orthogonal to the Y-axis.

20. The aircraft of claim 17, wherein no portions of the first side coupling interface joint and the second side coupling interface joint are within the one or more struts.

\* \* \* \* \*